United States Patent

[11] 3,598,067

| [72] | Inventor | Allen J. Jones<br>Fall Creek, Oreg. |
|---|---|---|
| [21] | Appl. No. | 25,974 |
| [22] | Filed | Apr. 6, 1970 |
| [45] | Patented | Aug. 10, 1971 |
| [73] | Assignee | Michel Lumber Company<br>Lake Oswego, Oreg. |

[54] DAMPER FOR HIGH TEMPERATURE OR CORROSIVE GASES
10 Claims, 6 Drawing Figs.

[52] U.S. Cl. .................................................. 110/163,
126/285 A
[51] Int. Cl. ..................................................... F23l 13/06
[50] Field of Search ........................................... 110/163;
126/285 R, 285 A

[56] References Cited
UNITED STATES PATENTS
2,646,792  7/1953  Hennig........................ 126/285 X 1,649,749 11/1927 Shook .......................... 126/285
1,832,748 11/1931 Starke .......................... 126/285
2,659,361 11/1953 Holbrook ...................... 126/285

FOREIGN PATENTS
332,550 2/1921 Germany...................... 126/285

Primary Examiner—Kenneth W. Sprague
Attorney—Lee R. Schermerhorn

ABSTRACT: A damper of refractory material has spaced openings to register with similar openings in a furnace wall when the damper is in open position. A short horizontal movement of the damper shifts the damper openings out of register with the wall openings to modulate or shut off the gas flow. The damper is moved by a cylinder and piston actuator. The damper is preferably suspended by long vertical rods having pivotal support a considerable distance above the damper or it may be supported on rollers or other suitable means.

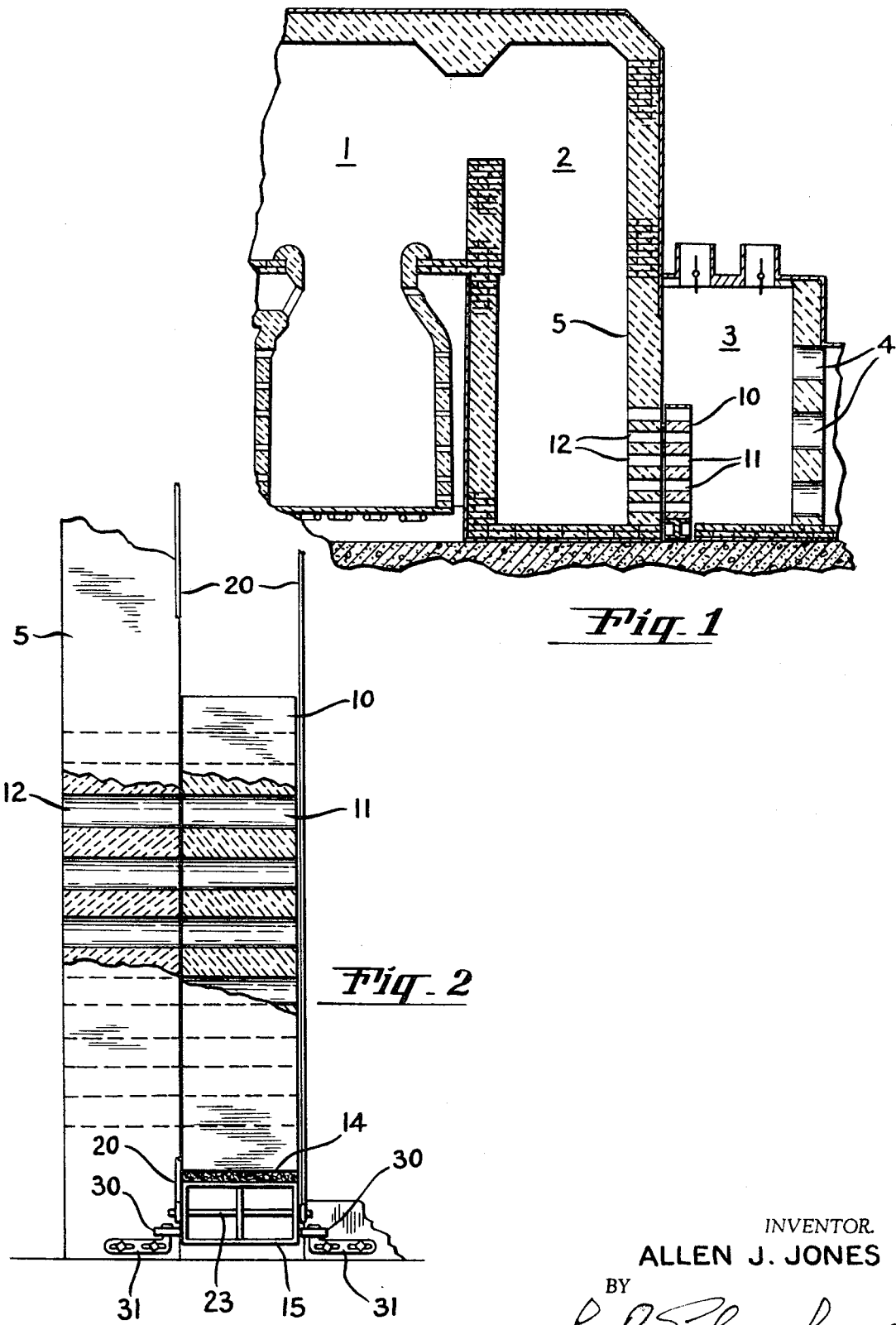

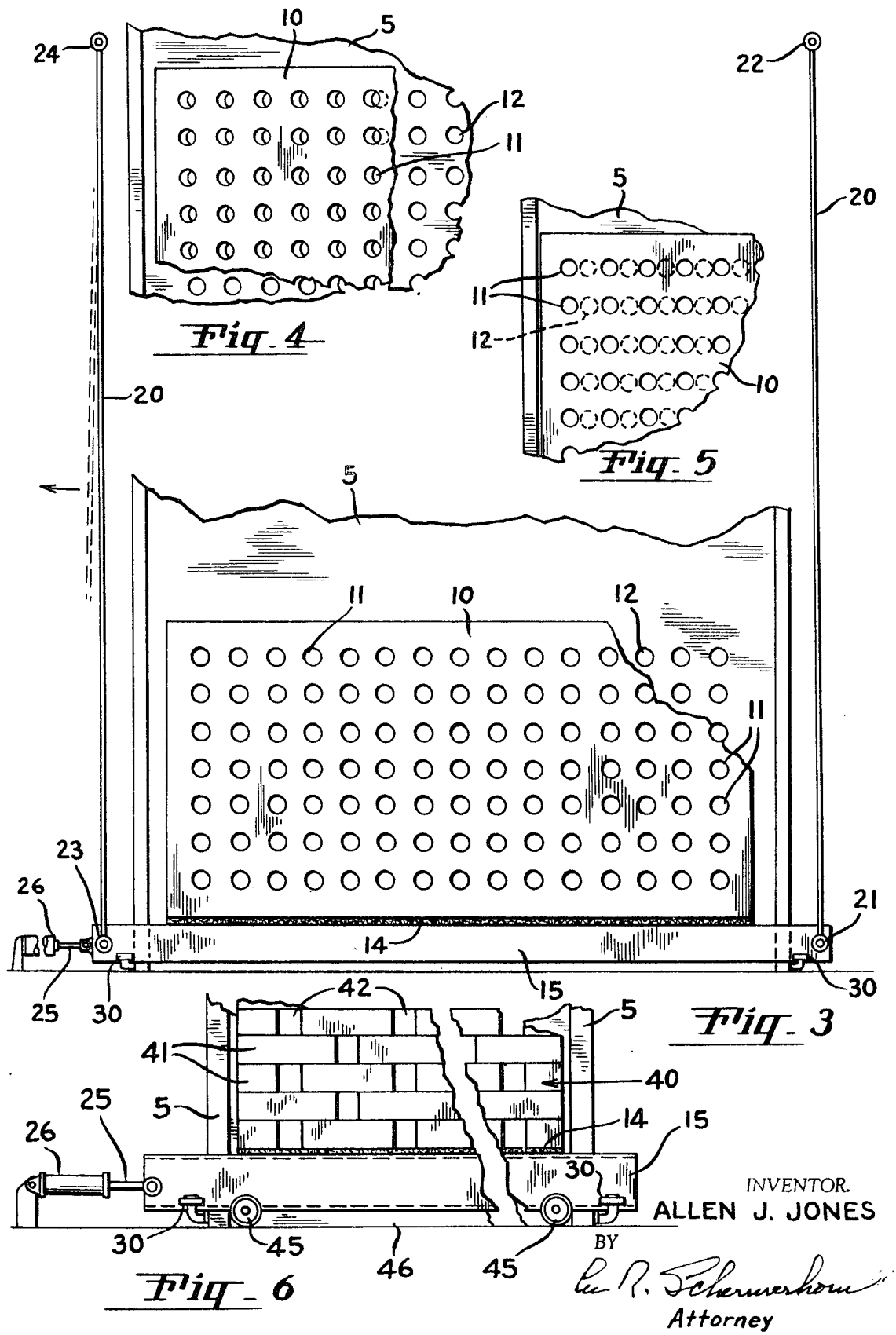

3,598,067

1

DAMPER FOR HIGH TEMPERATURE OR CORROSIVE GASES

BACKGROUND OF THE INVENTION

This invention relates to an improved damper construction for high temperature or corrosive gases.

In a large furnace such dampers have great weight and there is a problem of providing practical and durable mechanisms for supporting and moving the damper. It has been the practice heretofore either to raise or lower the damper a distance equal to its height or to shift it laterally a distance equal to its width in moving it from closed to open position. This entails complicated and expensive mechanism to support and move such a massive structure through such a long range of travel. The supporting and moving mechanisms must be effectively shielded to prevent rapid deterioration from exposure to high temperatures or corrosive gases.

Objects of the invention are, therefore, to provide an improved damper construction where the damper is exposed to high temperature or corrosive gases, to provide a damper having a short range of movement between open and closed positions, to provide improved supporting means for a damper of great weight and to provide a damper of the type described which is of relatively simple and inexpensive construction and is rugged and reliable in service under extremely adverse conditions.

SUMMARY OF THE INVENTION

The present damper is made of refractory material built up on a bottom steel supporting beam. The refractory material may be molded or cast as a monolith having openings therein to register with corresponding openings in a furnace wall. A short horizontal movement of the damper shifts the damper openings out of register with the wall openings to modulate or shut off the gas flow. The damper may also be built up of firebrick or tile having a checkerboard pattern of openings arranged to register with openings in a furnace wall of similar construction.

Preferably, the damper is supported on long vertical rods having upper ends mounted on pivots a considerable distance above the damper. This arrangement provides a relatively free swinging movement for a damper of great weight wherein the damper may easily be shifted horizontally from open to closed positions by a simple and inexpensive hydraulic actuator. Since the movement is a short range movement, other means of support are also available.

THe invention will be better understood and additional objects and advantages will become apparent from the following description of the preferred embodiments illustrated in the accompanying drawings. Various changes may be made, however, in the details of construction and arrangement of parts and certain features may be used without others. All such modifications within the scope of the appended claims are included in the invention.

BRIEF DESCRIPTION OF THE DRAWINGS

FIG. 1 is a vertical section view of a portion of a furnace equipped with a damper embodying the principles of the invention;

FIG. 2 is an enlarged view of a portion of FIG. 1, with parts in elevation;

FIG. 3 is a front elevation view of the damper, with parts broken away, showing the damper in open position;

FIG. 4 is a fragmentary view similar to FIG. 3, showing the damper partially open;

FIG. 5 is a similar view showing the damper fully closed; and

FIG. 6 is a fragmentary front elevation view, with parts broken away, showing a modification.

DESCRIPTION OF THE PREFERRED EMBODIMENTS

FIG. 1 shows a furnace construction having a primary combustion chamber 1 and a secondary combustion chamber 2. An adjacent chamber 3 has outlet tubes 4 for conveying combustion gases and hot air from the furnace to a point of utilization as, for example, a dry kiln for drying lumber or wood veneer. It is necessary to control the flow of hot gases through wall 5 separating chambers 2 and 3. Damper 10, which is exposed to the high temperature in secondary combustion chamber 2, performs this function.

As shown in FIGS. 2 to 5, damper 10 is made of a monolithic mass of cast refractory material having openings 11 therethrough. The lower portion of wall 5 adjacent damper 10 is made in a similar manner of cast refractory material having openings 12 therethrough which register with the damper openings 11. The horizontal distance between the openings in both damper 10 and the wall 5 is slightly greater than the diameter of the openings whereby horizontal movement of the damper to its FIG. 5 position completely closes the openings 12. Movement of the damper halfway between FIG. 3 position and FIG. 5 position produces half open condition of the openings 12 as shown in FIG. 4.

The refractory material of damper 10 rests on a layer of insulating material 14 on a hollow air- or water-cooled steel support beam 15 which is disposed below the lowermost openings 12 where it is some distance out of the path of the hot furnace gases. As thus constructed, the damper in a typical installation is 4 feet high, 8 feet wide and 1 foot thick and weighs between 2 and 3 tons. The movement of such a damper in its high temperature environment obviously presents problems not encountered with most conventional dampers.

Movement of the damper is made relatively easy by its novel means of support. The damper is suspended by four hanger rods 20. The lower ends of two of the rods 20 are connected to a pivot pin 21 in one end of beam 15 with one rod 20 on each side of the beam. The upper ends of these rods 20 are supported on a pivot pin 22. At the other end of the beam 15 a pair of rods 20 is similarly connected to a pivot pin 23 and their upper ends are suspended from a pivot pin 24. The length of rods 20 is preferably about three times the height of the damper.

The length of the rods is so much greater than the height of damper 10 that within the range of movement required by the width of openings 11 angular movement of rods 20 is very small whereby the rise and fall of the damper is negligible. This allows the damper to be opened and closed with a relatively small force applied by piston rod 25 in hydraulic cylinder 26. Piston rod 25 is connected to one end of beam 15 in horizontal position to apply direct pull or thrust to the beam.

Suitable control means in a hydraulic circuit with cylinder 26 shift piston rod 25 back and forth to modulate the gas flow through draft openings 12. Preferably, the damper is in open position when rods 20 are vertical so that in case of failure of cylinder 26, the damper will tend to move to open position by gravity. The suspension may be arranged to provide a closed fail-safe position, if desired.

Pairs of rollers 30 engage opposite sides of beam 15 to guide the damper so that it will move in closely spaced relationship to wall 5. Rollers 30 are mounted on adjustable brackets 31 as shown in FIG. 2. The outer rollers 30 assume any side thrust on the damper exerted by a pressure difference existing between chambers 2 and 3. The various metal parts are shielded behind wall 5 from exposure to flow of hot gases through openings 12. The temperature in chamber 3 where the metal parts are situated is considerably lower than the temperature in chamber 2.

An alternative form of construction is shown in FIG. 6. Here, the damper 40 is built up of firebrick or refractory tiles 41 laid up in refractory mortar and spaced apart in each course to provide a checkerboard pattern of openings 42. In such cases, the wall 5 would be similarly constructed, with draft openings to register with the openings 42 when the damper is in open position. The openings are closed by moving the damper horizontally a distance slightly greater than the width of the openings.

In FIG. 6 the support beam 15 is mounted on rollers 45 to roll on rails in the floor 46. Because of the short range of movement of the damper, still other relatively simple types of support means are possible, such as upstanding pivotal arms pivotally supported below the floor level instead of above.

Having now described my invention and in what manner the same may be used, what I claim as new and desire to protect by Letters Patent is:

1. In a damper construction, a wall having draft openings therein spaced apart horizontally a distance slightly exceeding the width of the openings, a damper of refractory material having openings in register with said wall openings, a horizontal beam at the bottom of said damper supporting said refractory material, means supporting said beam for horizontal movement of the damper alongside said wall between open and closed positions, and means connected with said beam for moving said damper between said open and closed positions.

2. A damper as defined in claim 1, said beam being hollow for receiving fluid cooling means.

3. A damper as defined in claim 1, said moving means comprising a cylinder and piston.

4. A damper as defined in claim 1, said supporting means comprising pivotally mounted vertical arm pivotally connected to said beam.

5. A damper as defined in claim 1, said supporting means comprising vertical arms pendulus from supports above the damper and connected at their lower ends with said beam.

6. A damper as defined in claim 5, said arms comprising a first pair of rods on opposite sides of the beam connected to a transverse pin in one end of the beam and a second pair of rods on opposite sides of the beam connected to a transverse pin in the opposite end of the beam.

7. A damper as defined in claim 1 including guide rollers engaging opposite sides of said beam.

8. A damper as defined in claim 1, said supporting means comprising rollers on said beam.

9. A damper as defined in claim 1, said refractory material being cast in a monolithic block.

10. A damper as defined in claim 1, said refractory material comprising brick or tile laid up on said beam in spaced apart relation to form said openings.